Oct. 20, 1970   B. SPENCER, JR., ET AL   3,534,924
VARIABLE GEOMETRY MANNED ORBITAL VEHICLE
Filed Sept. 7, 1967   3 Sheets-Sheet 1

INVENTORS
BERNARD SPENCER, JR.
BEVERLY Z. HENRY, JR.

BY

ATTORNEYS

INVENTORS
BERNARD SPENCER, JR.
BEVERLY Z. HENRY, JR.
BY

ATTORNEYS

Oct. 20, 1970   B. SPENCER, JR., ET AL   3,534,924
VARIABLE GEOMETRY MANNED ORBITAL VEHICLE
Filed Sept. 7, 1967   3 Sheets-Sheet 3
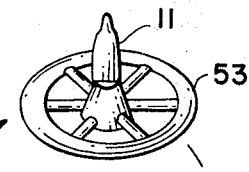
FIG. 5c
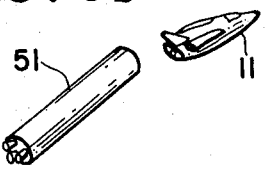
FIG. 5b
FIG. 5a
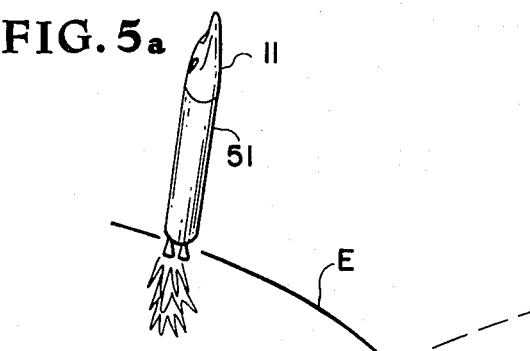
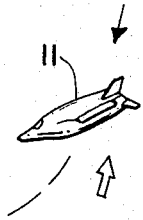
FIG. 5d
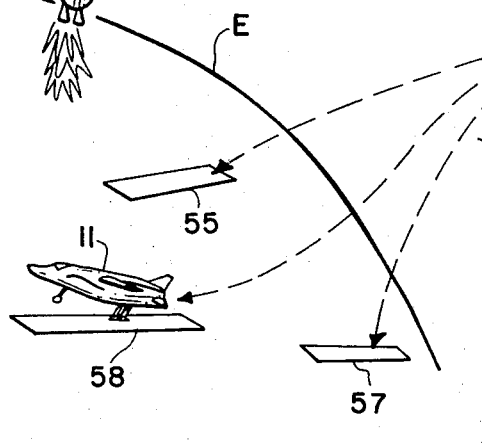
FIG. 5e
INVENTORS
BERNARD SPENCER, JR.
BEVERLY Z. HENRY, JR.
BY
ATTORNEYS

United States Patent Office 3,534,924
Patented Oct. 20, 1970

3,534,924
VARIABLE GEOMETRY MANNED ORBITAL VEHICLE
Bernard Spencer, Jr., Hampton, and Beverly Z. Henry, Jr., Yorktown, Va., assignors to the United States of America as represented by the Administrator of the National Aeronautics and Space Administration
Filed Sept. 7, 1967, Ser. No. 667,625
Int. Cl. B64c 25/00, 31/00, 37/00
U.S. Cl. 244—1                                    4 Claims

ABSTRACT OF THE DISCLOSURE

This invention relates to a reusable lifting reentry vehicle capable of high aerodynamic efficiency over the speed range from hypersonic reentry to low speed tangential landing. This high areodynamic efficiency is made possible by the use of a variable geometry vehicle configuration in which auxiliary, pivotal wings are incorporated allowing the uncompromised retention of an aerodynamically efficient lifting body shape at hypersonic speeds with the auxiliary wings folded into a stored position. At lower speeds the auxiliary wings are deployed at sweep angles decreasing from 90° to 0° as speed decreases providing improvements in lift, lift-drag ratio, and in the stability characteristics of the vehicle.

SPECIFICATION

This invention was made by employees of the National Aeronautics and Space Administration and may be manufactured and used by or for the United States Government without the payment of any royalties thereon or therefor.

One of the prime problems encountered thus far in manned space flight is the limited methods of returning space vehicles through the earth's atmosphere to a safe recovery area. In the Mercury and Gemini programs, and as presently anticipated in the Apollo program, safe space vehicle recovery appears dependent upon parachute-controlled descent into the oceans where the vehicle may be retrieved by standy recovery ships. Due to the manpower and equipment involved this obviously is an expensive and time-consuming procedure and improvements in vehicle descent characteristics to permit maneuverable flight and conventional, aircraft-type, landing at any one of the many airfields in the country would be highly desirable, especially with the anticipated increased frequency of launch and return from orbit. Considerable research has been conducted in an effort to obtain a reliable reentry vehicle configuration that can be effectively maneuvered by the vehicle occupant(s) and landed in similar fashion to conventional aircraft. A major obstacle to achievement of this objective has been the inherent incompatability between aerodynamic configurations capable of good performance at hypersonic speeds and those capable of conventional, horizontal landing at subsonic speeds. This incompatability manifests itself in that configurations capable of surviving the severe environmental conditions of reentry and of providing high aerodynamic performance at hypersonic speeds are incapable due to their required shape of providing sufficient lift and lift-to-drag ratio for low speed operation. The design approach normally taken is to compromise the hypersonic shape to provide sufficient lift and lift-to-drag ratio at low speeds with the result that performance is reduced at hypersonic speeds and is marginal at subsonic speeds.

Accordingly, it is an object of the present invention to provide a lifting body configuration for multimanned orbital vehicles that can be operated in an aerodynamically efficient manner and maneuvered by the vehicle crew over the required flight velocity spectrum from reentry to landing, with maximum crew safety as a prime consideration.

Another object of the present invention is the provision of a reusable lifting reentry vehicle which employs variable sweep auxiliary wing panels to allow the retention of an efficient aerodynamic shape at hypersonic speeds with the wings retracted and to improve the vehicle lift, lift-to-drag ratio, and stability characteristics at low speeds by deployment of the wings.

Another object of the present invention is an improved reentry vehicle for use in an overall logistics/ferry system.

A further object of the present invention is a reentry vehicle that is readily maneuverable and controlled by an occupant therein to permit conventional, horizontal landing of the vehicle at a variety of prepared landing sites.

Another object of the present invention is a lifting body reentry vehicle for multimanned missions to enable space station crew rotation and ferrying of non-astronaut-type passengers from earth to space stations and return.

According to the present invention, the foregoing and other objectives are attained by providing a reentry vehicle developed from a basic theoretical minimum-hypersonic-wavedrag body shape of elliptical cross section modified by (1) the inclusion of nose bluntness to reduce aerodynamic heating at this point, (2) the addition of two highly cambered, deployable, wing panels to improve the lift, lift-to-drag ratio and stability characteristics at supersonic and subsonic speeds, (3) the inclusion of a canopy to provide pilot vision and an aft extension of this canopy to provide environmental protection of the wing panels when in the stored position, and (4) the addition of aft vertical and horizontal control surfaces to provide longitudinal and lateral stability.

During the boost, orbital, and reentry phases of the flight the deployable wing panels are stored out of the vehicle flow field protected from the severe heating environment. Following the reentry phase of the flight the attitude of the vehicle is adjusted to produce maximum lift, maximum lift-to-drag ratio, or some intermediate combination depending on the specific mission and the vehicle is maneuvered toward the selected landing site. As the speed of the vehicle is reduced to the supersonic regime, and the regions of high aerodynamic heating have been traversed, the wings may herein be deployed simultaneously with the sweep angle decreasing as speed decreases, simultaneously improving the lift, lift-to-drag ratio, and stability characteristics of the vehicle. As the vehicle approaches the landing site the wings are fully unswept as is conventional in the landing of variable sweep aircraft.

During the landing maneuver trailing edge flaps on the wings can be deployed to further increase the lift and reduce the forward velocity at touchdown. While the normal mode for landing a vehicle of this type is of the glide type the use of a small propulsion system allows the vehicle to be flown as a conventionally powered aircraft for range extension or recovery from a missed approach to the touchdown point.

The vehicle of the present invention is capable of transporting a three-man crew and at least six non-astronaut-type passengers between earth and other planets or space stations. An airlock port is provided in the aft end of the vehicle to permit ingress and egress of the crew and passengers when the vehicle is docked to a space station or the like. As previously stated, a suitable propulsion system may also be provided in the vehicle when needed to extend maneuver capability more than permitted in its natural glide to a selected landing site.

A more complete appreciation of the invention and many of the attendant advantages thereof will be readily understood by reference to the following detailed description when considered in connection with the accompanying drawings wherein:

FIGS. 5a–5e represent a voyage sequence of events in launching, orbiting operation, docking with a space station, reentry and touchdown on a landing strip.

Figure 1:
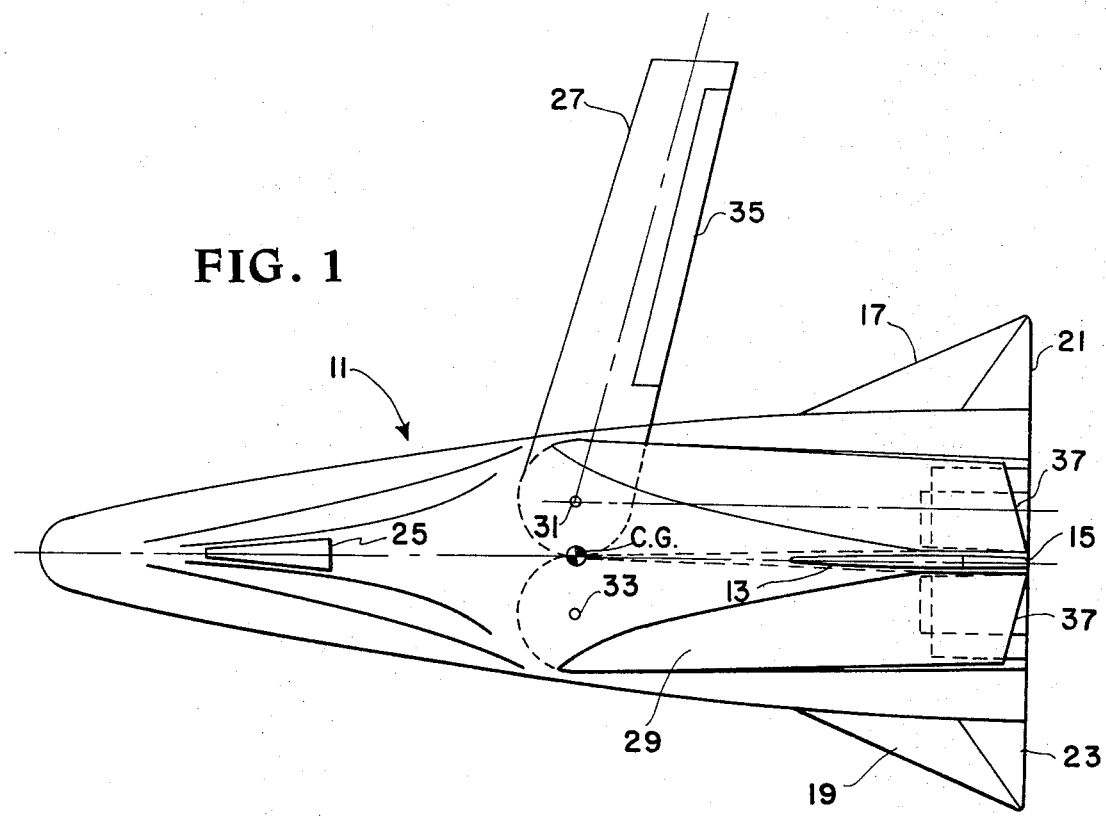
FIG. 1 is a top view of the reentry vehicle according to the present invention and illustrating the variable speed auxiliary wing panels.
Figure 2:
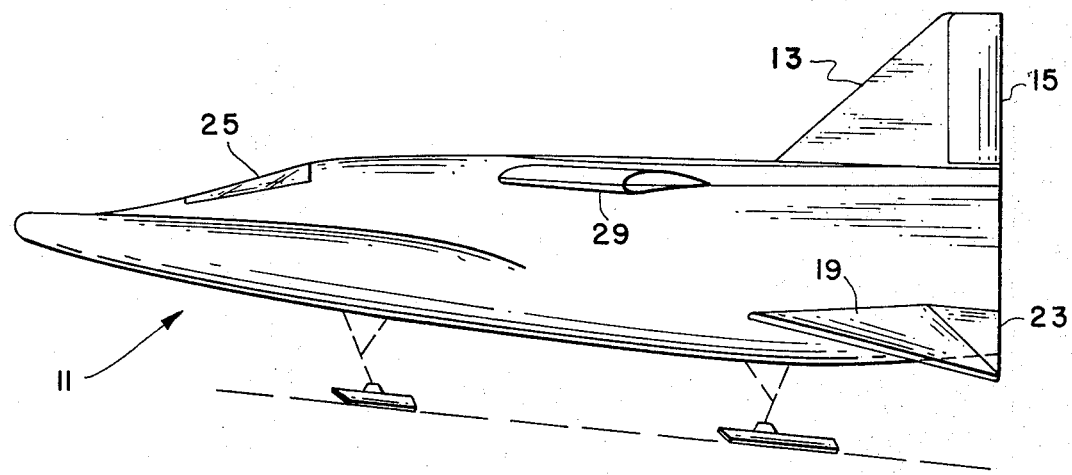
FIG. 2 is a side view of the vehicle shown in FIG. 1 and schematically showing the vehicle landing gear.

Referring now more particularly to the drawings, wherein like reference numerals designate identical parts throughout the several views, and more particularly to FIGS. 1 and 2, there is shown a reentry vehicle generally designated by reference numeral 11. Vehicle 11 is a multi-manned reentry vehicle derived from a basic lifting body conforming to a theoretical hypersonic minimum wave drag body of elliptical cross section modified by nose bluntness. A vertical tail 13 is disposed along the vehicle mean center line at the aft end thereof and contains a conventional rudder assembly 15 for directional control at the lower speeds. Center vertical tail 13 is essentially a flat plate in section and is provided with a rounded leading edge and a blunt trailing edge. A pair of horizontal trails 17 and 19 are also provided at the aft end of vehicle 11 and extend therefrom at a dihedral angle such as to provide longitudinal and lateral control; in the case shown at a dihedral angle of −30°. Elevons 21 and 23 are movably secured to horizontal tails 17 and 19 respectively for pitch and roll control. Horizontal tails 17 and 19 are essentially triangular in planform and are provided with semicylindrical leading edges and a leading edge sweep of approximately 63°. Conventional control actuators, not shown in the interest of clarity, provide selective movement of all control surfaces in a conventional manner. A raised canopy 25 is provided on the upper side of vehicle 11 to provide visibility for the vehicle crew during the landing maneuver. A pair of pivotable, highly cambered variable sweep wings 27 and 29 are disposed aft of canopy 25 and are selectively movable about their respective pivot points 31 and 33 through a 0°–90° angle sweep, as will be further explained hereinafter. Wings 27 and 29 have a St. Cyr 156 (Royer) cambered airfoil section, a taper ratio of 0.75, an aspect ratio of 10, and a maximum thickness ratio of 0.18. High lift devices in the for of extensible flaps 35 are disposed on the trailing edges of the deployable wing panels 27 and 29 and movable afterbody flaps 37 are disposed on the aft body surfaces of the vehicle 11. The afterbody flaps 37 are used for trim control of the vehicle at the higher flight speeds and have a ratio of flap chord to body length of approximately .098 and a ratio of flap area to body planform area of approximately .097. The leading edges of the wings 27 and 29, the horizontal tails 17 and 19, and the vertical tail 13, are all protected against the high temperature environment by the use of appropriate heat resistant materials.

Figure 3:
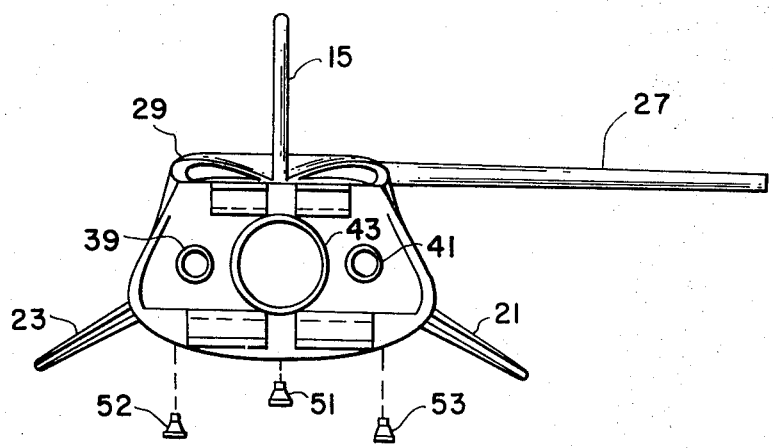
FIG. 3 is a rear view of the vehicle shown in FIG. 1.

Referring now more particularly to FIG. 3, the rear view of vehicle 11 shows exhaust nozzles 39 and 41 leading from small propulsion motors which may be used as additional propulsion for vehicle 11 when necessary in maneuvering to a specific landing area. Opening 43 in vehicle 11 is an airlock passageway which permits crew and passenger ingress and egress between vehicle 11 and a space station or the like.

Figure 4:
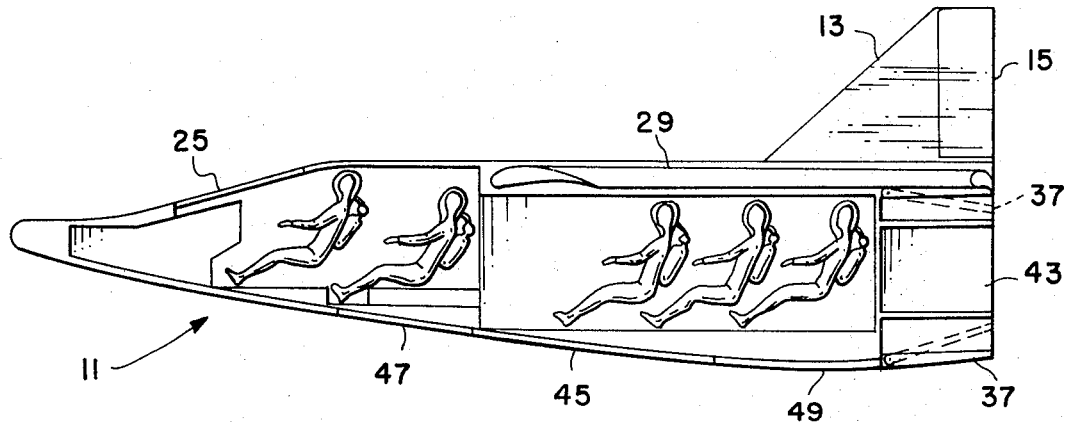
FIG. 4 is a somewhat schematic sectional view of the interior of the vehicle illustrated in FIG. 1.

Referring now to FIG. 4, the schematic illustration of the interior of vehicle 11 is shown. Vehicle 11 is designed to carry a crew of two-three and additional passengers or non-astronaut-type occupants of as many as six-seven. In addition, some cargo space is provided for transferring stores from earth to an orbiting space station with additional storage space being possible at the penalty of carrying less than the alloted passengers. As shown in this figure, the airlock passageway 43 is openable adjacent to the passenger compartment which readily permits passenger and crew mobility therethrough when changing space station crews and the like. Vehicle 11 is provided with suitable thermal protection shielding 45 over the lower body surface, the horizontal tails, and portions of the upper surfaces as required. Movable panels 47 and 49 of shielding material 45 permit extension of the nose gear and the main landing gear as schematically illustrated in FIG. 2. The landing gears form a conventional tricycle-type landing gear consisting of a forward skid 51 and a pair of rear skids 52 and 53, or in the alternative the skids can be replaced with wheels.

Referring now more particularly to FIGS. 5a–5e where a schematic representation of a complete space flight is shown, the operation of the present invention will best be understood. FIG. 5a shows the vehicle 11 being propelled from earth E by a suitable rocket launch vehicle 51. During the launch phase of the mission wings 27 and 29 remain in the retracted position shown in FIG. 1. Following the boost phase vehicle 11 separates from the launch vehicle 51 (FIG. 5b) and establishes its orbit in a conventional manner. Additional cargo may be carried within a structure used to secure and aerodynamically fair the vehicle 11 to the launch vehicle 51. This adaptor structure is jettisoned prior to starting the reentry maneuver.

Vehicle 11 may then be maneuvered by the crew through the use of propulsion rockets 39, 41 and/or other control jets, not shown, to rendezvous and dock with manned space station 53 which has previously been "parked" in a specific orbit as schematically illustrated in FIG. 5c. After docking with space station 53, crews and/or passengers may be exchanged; stores, scientific test equipment and the like may be loaded and unloaded through airlock 43 which connects with a similar airlock, not shown, on space station 53. After accomplishing this operation, reentry vehicle 11 may effect separation from space station 53 and take itself out of orbit through the application of retrothrust at a predetermined point above the earth's surface and descend into the earth's atmosphere along a predetermined trajectory.

During the reentry phase of the flight, vehicle 11 operates as a lifting body with reaction controls, not shown, being utilized to position the vehicle in the proper atitude, approximately 45° angle of attack, for reentry into the atmosphere in a manner to minimize the aerodynamic heating load. During reentry the vehicle structure and its contents are protected from the heating by the thermal protective shielding 45. Within the atmosphere the aerodynamic controls 21, 23, 37 and 15 become effective and are selectively activated to maneuver the vehicle along a gliding flight path corresponding to maximum lift, maximum lift-to-drag ratio, or some intermediate path depending on the mission and range requirement to the selected landing site. The vericle flies as a lifting body along a controlled gliding path until the speed is reduced by aerodynamic drag to moderate supersonic values at which point deployment of the variable sweep wing panels 27 and 29 (FIG. 1) is begun. The wings are progressively deployed as speed decreases in a manner to maximize lift-to-drag ratio and to provide the desired stability characteristics. As the vehicle velocity decreases to subsonic and the landing site is approached the wings are fully deployed, the high lift flaps 35 are extended, the landing gear 51 and 52 are extended and the vehicle lands as a conventional aircraft.

Wings 27 and 29 thus provide vehicle 11 with a high lift and lift-to-drag ratio at subsonic speeds and permits the crew to pilot the craft to the desired landing strip 55 or alternate landing strips 57 or 58 and land horizontally as in conventional aircraft and as shown schematically in FIG. 5e. As mentioned hereinbefore, if it is determined that the glide flight of vehicle 11 will not permit the distance required for a selected landing strip, or if it becomes necessary to recover from a missed landing, rocket engines 39 and 41 can be actuated to provide propulsion to the vehicle for limited distances.

Although only a preferred embodiment and operation of the present invention has been shown and described, it is to be understood that various modifications and variations of the present invention are possible in the light of the above teachings and such modifications may be made therein without departing from the spirit and scope of the invention as set forth in the appended claims. For example, although the invention has been described herein solely for use in ferry transport between earth and an orbiting space station, it should be understood that the vehicle is also capable of use within the earth's atmosphere as a craft capable of extreme velocities, and capable of use as a ferry vehicle between the various planets. Obviously modifications of this type and others are possible by merely employing more powerful propulsion systems for the limited propulsion units 39 and 41 described.

It is therefore to be understood that the invention may be practiced otherwise than as specifically described.

What is claimed as new and desired to be secured by Letters Patent of the United States is:

1. A reusable, lifting, reentry vehicle having high aerodynamic efficiency in the speed range of hypersonic to low speed landing speeds comprising:
    a blunted body configuration of modified elliptical cross section,
    a vertical tail for said body disposed along the means centerline thereof,
    a raised canpoy on said body and disposed forward of said vertical tail,
    horizontal tail means fixed on said body,
    afterbody flaps on the aft end of said body,
    variable sweep wings for said body and progressively movable from a 0° sweep position completely overlying said body at hypersonic speds to a position 90° relevant to the body longitudinal axis at landing speed,
    said variable sweep wings being highly cambered airfroil sections with high lift flaps being provided extensible from the trailing edge thereof, and
    wherein said horizontal tails are triangular in planform, have rounded leading edges and a leading edge sweep of approximately 63°, with movable elevons provided thereon for pitch and roll control.

2. The reentry vehicle of claim 1 wherein the afterbody flaps have a ratio of the flap chord to the vehicle body length of approoixmately 0.098 and a ratio of the flap area to the body reference area of approximately 0.097.

3. The reentry vehicle of claim 1 wherein said variable sweep wings are provided with a cambered airfoil section and have a taper ratio of 0.75, an aspect ratio of 10, and a maximum thickness ratio of 0.18.

4. The reentry vehicle of claim 1 including airlock means at the aft end of said body to permit crew and passenger ingress and egress and to permit transfer of stores to and from said vehicle.

References Cited

UNITED STATES PATENTS

| | | | |
|---|---|---|---|
| 2,774,556 | 12/1956 | Robert | 244—46 |
| 3,104,079 | 9/1963 | Phillips | 244—1 |
| 3,132,825 | 5/1964 | Postle et al. | 244—1 |
| 3,276,722 | 10/1966 | Eggers et al. | 244—1 |
| 3,289,974 | 12/1966 | Cohen et al. | 244—1 |
| 3,292,881 | 12/1966 | Ricard | 244—46 |
| 3,369,771 | 2/1968 | Walley et al. | 244—1 |
| 3,390,853 | 7/1968 | Wykes | 244—1 |

BENJAMIN A. BORCHELT, Primary Examiner

T. H. WEBB, Assistant Examiner

U.S. Cl. X.R.

244—46, 49